United States Patent [19]
Choquet

[11] Patent Number: 5,747,042
[45] Date of Patent: May 5, 1998

[54] METHOD FOR PRODUCING CARBON DIOXIDE, FUNGICIDAL COMPOUNDS AND THERMAL ENERGY

[76] Inventor: Claude Choquet, 1784 Prieur Street East, Montréal (Québec), Canada, H2C 1M7

[21] Appl. No.: 721,210

[22] Filed: Sep. 26, 1996

[51] Int. Cl.$^6$ .................. A01H 65/00; C01B 31/20
[52] U.S. Cl. ............ 424/195.1; 47/17; 71/23; 423/224; 424/40; 504/101
[58] Field of Search .................. 47/17; 504/101; 71/14, 23; 424/195.1, 40; 423/224

[56] References Cited

U.S. PATENT DOCUMENTS

| | | | |
|---|---|---|---|
| 3,949,522 | 4/1976 | Kehl et al. | 47/17 |
| 4,048,938 | 9/1977 | Willard | 424/125 |
| 5,185,139 | 2/1993 | Krishnamurthy et al. | 423/359 |
| 5,228,303 | 7/1993 | Assaf | 62/94 |
| 5,392,611 | 2/1995 | Assaf et al. | 62/271 |
| 5,409,508 | 4/1995 | Erickson | 47/1.01 R |

FOREIGN PATENT DOCUMENTS

| | | |
|---|---|---|
| 1045465 | 1/1979 | Canada. |
| 1145616 | 5/1983 | Canada. |
| 1165974 | 4/1984 | Canada. |
| 2018266 | 12/1991 | Canada. |
| 1328200 | 4/1994 | Canada. |
| 2140957 | 1/1995 | Canada. |

*Primary Examiner*—Herbert J. Lilling
*Attorney, Agent, or Firm*—Merek & Voorhees

[57] ABSTRACT

Provided herein is a method and apparatus for producing carbon dioxide, fungicidal compounds and thermal energy. The method comprises the steps of: (a) introducing into a forced fire combustion chamber a first stream of ambient air and a second stream consisting of a solid organic source selected from the solid organic fuels consisting of agricultural products including corn, shelled corn, crushed corn peat, corn kernels, ears of corns, corn cobs, straw, bagasse, wheat, beet, rye, barley, beans, potatoes, compressed organic material as a by-product of organic transformation industries or of wood transformation industries and mixtures thereof; (b) causing the combustion of said solid organic source resulting in the production of thermal energy, flue gas and waste ashes, said flue gas transporting said thermal energy and having a content indicative of a carbon dioxide production rate near a stoichiometric combustion equation; (c) maintaining said first stream at a pressure greater than standard atmospheric pressure; (d) periodically purging said waste ashes from said combustion chamber so as to favor the maintenance of a well-aerated forced fire; (e) transporting and cooling said flue gas by passage through a heat exchanging element at a positive pressure, thereby creating a pressurized stream of exhaust gas rich in carbon dioxide; and (f) accumulating said pressurized exhaust gas.

10 Claims, 1 Drawing Sheet

METHOD FOR PRODUCING CARBON DIOXIDE, FUNGICIDAL COMPOUNDS AND THERMAL ENERGY

FIELD OF THE INVENTION

The present invention relates to a novel cost-efficient method and apparatus for producing carbon dioxide ($CO_2$) and thermal energy from solid organic fuels including agricultural products, wastes and culls. More specifically, the present invention relates to a method and apparatus for producing $CO_2$ gas and fungicidal compounds and substantially free of harmful pollutants and contaminants such as ethylene. In one aspect, the inventive method and apparatus are particularly well suited for enriching the $CO_2$ gas concentration and controlling the fungus growth in a greenhouse or growing chamber wherein the growing flora will experience enhanced growth resulting from the enrichment of $CO_2$ gas concentration and the presence of is fungicidal compounds.

In the present invention, the expression "solid organic fuel" refers, without limitation, to a variety of agricultural products including shelled corn, crushed corn, peat, wheat, beet, rye, barley, beans, potatoes, and particularly surpluses and culls thereof, other agricultural wastes and surpluses such as corn kernels, ears of corns, corn cobs, straw and bagasse or compressed organic material as a by-product of organic transformation industries or of wood transformation industries and mixtures thereof.

BRIEF DESCRIPTION OF THE PRIOR ART

It is known to produce carbon dioxide ($CO_2$) by combustion of fossil fuels such as liquefied petroleum, propane or natural gas in the presence of excess oxygen so as to strive towards complete combustion of the fossil fuel resulting in nearly pure $CO_2$ and water vapor. An example of such methods and related apparatus are disclosed in U.S. Pat. No. 5,185,139 of Krishnamurthy et al. and U.S. Pat. No. 4,073,089 of Maginnes et al. It is also known to use various expensive methods and related apparatus, including cryogenic separation and solvent extraction, to further purify the resulting $CO_2$ gas for eventual uses requiring pure $CO_2$ gas.

Various uses Of $CO_2$ gas are known. For example, $CO_2$ gas is commonly used in oil field drilling operations to enhance crude oil recovery. $CO_2$ gas is of course used in a variety of beverage preparations. $CO_2$ gas also has a number of medical uses. It is also known to use $CO_2$ gas to enrich the $CO_2$ concentration of greenhouses and other growing chambers. Indeed it has been clearly demonstrated that enriched $CO_2$ gas content in such enclosures dramatically promotes plant growth while remaining at sufficiently low concentrations to avoid deleterious effects on humans or animals exposed to such $CO_2$ enriched atmospheres. The normal $CO_2$ concentration in ambient air is approximately 350 ppm. It is now commonly accepted that a 1000–1500 ppm concentration of $CO_2$ gas is ideal for optimal growth of most plant species.

It is also known to use various expensive methods and related apparatus to obtain fungicidal compounds. However, synthetically obtained compounds may adversely affect useful insects and expose consumers to toxicity risks.

Greenhouses are traditionally supplied with $CO_2$ gas from reservoirs containing compressed $CO_2$ gas delivered through suitable nozzles placed in strategic areas of the greenhouse. Control systems have also been developed so as to monitor and regulate the delivery of the compressed $CO_2$ gas and to maintain a chosen concentration Of $CO_2$ in the greenhouse. For large greenhouses, it is also known to use the more cost-efficient approach of using a conventional fossil fuel burner/$CO_2$ gas generator, which typically comprises a propane gas burner and an exhaust pressure regulator. For example, in U.S. Pat. No. 5,228,303 issued to Assaf, $CO_2$ gas is generated by a fuel-fired boiler and piped into a greenhouse. It is common to use liquefied petroleum, propane or natural gas as fuels.

The main drawback of the prior art methods relates to the cost of providing the $CO_2$ gas enrichment. Purchasing the $_2CO$ gas from reservoirs is of course the most expensive approach and only finds use for small growing chambers or greenhouses. The burning of fossil fuels is also expensive. As a result, while those methods of $CO_2$ gas enrichment are known, the scale of their use is limited by basic cost vs. benefit analyses.

Another drawback relating to the burning of fossil fuels is that depending on the burner used and the burning conditions, harmful pollutants may be generated.

Up to now, it was believed that the use of agricultural products as a solid combustion fuel would produce substantial quantities of by-products such as NO (nitrogen monoxide), $NO_2$ (nitrogen dioxide), CO (carbon monoxide), $C_2H_4$ (ethylene) and organic gases such as polyaromatic gases. The release into a greenhouse of the exhaust gas produced from common fuel combustion, while enriching the $CO_2$ gas concentration, would necessarily introduce pollutants such as $C_2H_4$ (ethylene) or polyaromatic gas, deleterious and often lethal for plant life.

SUMMARY OF THE INVENTION

Thus the purpose of the present invention is to provide a cost-efficient and environmentally friendly method for producing $CO_2$ gas for multiple uses and preferentially for use in the $CO_2$ and fungicidal compounds enrichment of greenhouses and growing chambers.

In accordance with one aspect of the present invention, there is provided an improved method for producing carbon dioxide and optionally thermal energy which comprises the steps of:

(a) introducing into a forced air fire combustion chamber a first stream of ambient air under a positive pressure and a second stream consisting of a solid organic source selected from the solid organic fuels consisting of agricultural products including shelled corn, crushed corn, hops peat, corn kernels, ears of corns, corn cobs, straw, bagasse, wheat, beet, rye, barley, beans, potatoes, compressed organic material as a by-product of organic transformation industries or of wood transformation industries and mixtures thereof;

(b) causing the combustion of said solid organic source resulting in the production of thermal energy, flue gas and waste ashes, said flue gas transporting said thermal energy and having a content indicative of a carbon dioxide production rate near a stoichiometric combustion equation;

(c) maintaining said first stream at a pressure greater than standard atmospheric pressure;

(d) periodically purging said waste ashes from said combustion chamber so as to favor the maintenance of a well-aerated forced air fire;

(e) transporting and cooling said flue gas by passage through a heat exchanging element at a positive pressure, thereby creating a pressurized stream of exhaust gas rich in carbon dioxide;

(f) accumulating said pressurized exhaust gas.

In another aspect of the present invention, there is provided an apparatus for producing carbon dioxide and optionally thermal energy from the combustion of a first stream of ambient air and a second stream consisting of a solid organic fuel source selected from the solid organic fuels consisting of agricultural products including corn, shelled corn, crushed corn peat, corn kernels, ears of corns, corn cobs, straw, bagasse, wheat, beet, rye, barley, beans, potatoes, compressed organic material as a by-product of organic transformation industries or of wood transformation industries and mixtures thereof, said apparatus comprising:

(a) a solid organic preparator comprising a solid organic loading element having control means for controlled input of solid organic fuels to a combustion chamber;

(b) an ambient air dispenser for controlled and pressurized input of said air to a combustion chamber;

(c) a $CO_2$ and fungicidal compound generator comprising at least one high efficiency combustion chamber adapted to receive said solid organic fuels and said air and to produce an exhaust gas comprising $CO_2$ and fungicidal compounds;

(d) at least one exhaust gas conduit connected to at least one heat exchanger unit for selectively diverting thermal energy from said exhaust gas;

(e) an exhaust gas accumulator unit having controllable gas release means for the controlled release of said exhaust gas in an enclosed environment in need of $CO_2$ and fungicidal compounds enrichment.

(f) a controller and monitoring module for monitoring the concentration of $CO_2$ gas in said enclosed environment and for controlling via electric and electronic relays the operation of said air dispenser, solid organic preparator, combustion chamber, heat exchanger and exhaust gas accumulator.

Advantageously, the apparatus will be used inside a greenhouse or other plant growing enclosure to maintain the level of $CO_2$ gas therein.

Another benefit of the use of the apparatus is the production of trace amounts of fungicidal compounds in the combustion gases which protect plants and favor their unhampered growth and development.

Thus, there has surprisingly been discovered a method, related apparatus and its use for the production of a $CO_2$-rich flue gas from a solid organic fuel while essentially avoiding the production of harmful pollutants.

BRIEF DESCRIPTION OF THE DRAWING

Preferred embodiments of the invention are described in detail hereinafter with reference to the accompanying drawing, in which.

DETAILED DESCRIPTION OF PREFERRED EMBODIMENTS

Figure 1:
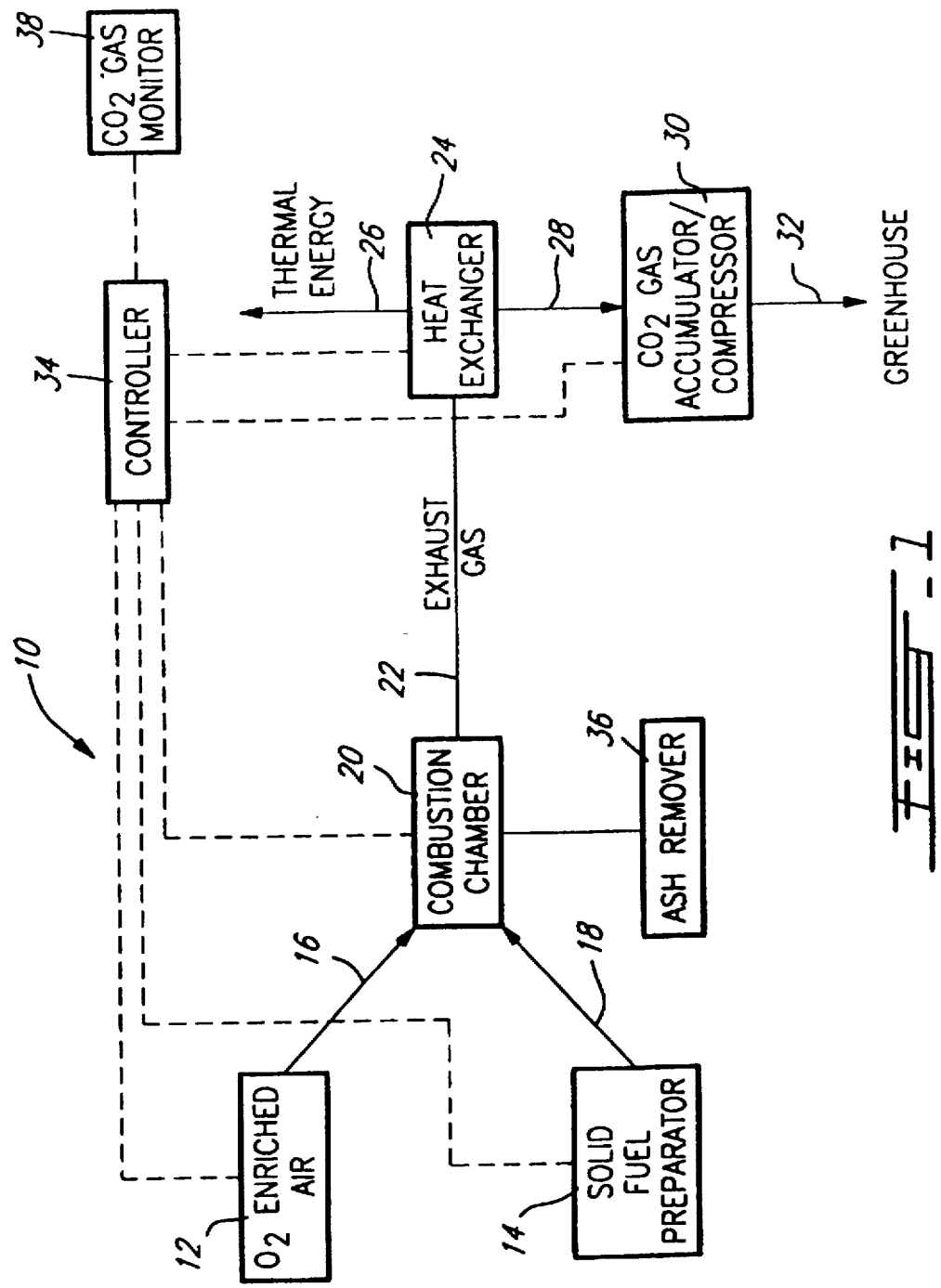
FIG. 1 is a schematic view of the main components of the apparatus of the present invention for use in $CO_2$ and fungicidal compounds enrichment of a plant growing enclosure.

Referring to FIG. 1, there is shown a $CO_2$ gas and fungicidal compound producing apparatus generally designated by numeral 10. Apparatus 10 comprises a source 12 of ambient air under positive pressure and a solid organic preparator unit 14 both connected through appropriate conduits 16 and 18, respectively, to a high efficiency combustion chamber 20. In a most preferred embodiment, apparatus 10 will be installed inside a greenhouse and will elevate and maintain the $CO_2$ and fungicidal compound concentrations therein so as to promote optimal plant growth.

The solid organic preparator unit 14 advantageously comprises a fuel loading auger or other loading device, in which the solid organic fuel material is dropped. In a preferred embodiment, the fuel loading auger will be of the type described in U.S. Pat. No. 5,343,819, issued to Charest. Such a fuel loading auger is advantageous in that it permits a controlled input of solid organic to combustion chamber 20.

Thus, combustion chamber 20 receives fuel and ambient air. If necessary, the ambient air can be enriched in oxygen by about 10 percent over the oxygen content of ambient air so as to promote complete combustion in excess of oxygen. To limit flue gas temperature, exhaust gases can optionally contain an even larger amount of excess air. The fuel is received from the top of the combustion chamber while ambient air is lanced under positive pressure from above and underneath the combustion bed. In a preferred embodiment of the present invention, the combustion chamber will be equipped with excellent aeration stream to promote a strong forced air combustion fire (also known as a forge fire) and convenient mechanisms for the controlled input of solid organic to the combustion chamber, the goal being to achieve nearly complete combustion, i.e. near stoichiometric ratios, of the solid organic fuel with minimal ash accumulation, maximal $CO_2$ gas and maximal fungicidal compound production. A very good and efficient combustion fire can be described as a charcoal type fire receiving ventilation from above and underneath the charcoal bed. The resulting charcoal bed develops useful mechanical properties including a porosity which promotes even ventilation and enhances the calorific power of the solid organic fuel. Advantageously, a device such as a corn furnace as described in U.S. Pat. No. 5,343,819 to Charest can be used.

It is to be understood by those skilled in the art that the combustion parameters, combustion fire temperature, ambient air input volume and pressure and solid organic input volume and moisture content may be finely tuned and appropriately controlled so as to optimize the combustion process efficiency and maximize $CO_2$ gas and fungicidal compound production.

Optionally, the furnace device will be provided with an automatic ignition starter. Such a device could comprise an electrical coil surrounded by an enclosure within which the combustible material will travel when entering the combustion chamber. The electrical coil will be sufficiently heated to cause spontaneous ignition of the combustible material.

Combustion exhaust gas from combustion chamber 20 exits through appropriate conduits 22 and is directed to an optional treatment unit (not shown) capable of removing unwanted compounds from said exhaust gas. For example, the optional pretreatment may comprise a porous gas adsorption matrix for entrapping or chemically modifying specific compounds. It is to be understood that the optional treatment unit may be directly connected to the exhaust conduit 22 of the combustion chamber 20 or alternatively further downstream of the apparatus of the present invention.

Combustion exhaust gas proceeds from conduit 22 to a heat exchanger unit 24 capable of diverting thermal energy from said exhaust gas so as to selectively warm or cool the exhaust gas which will eventually be dispensed to the greenhouse. The heat exchanger unit 24 may be any suitable heat exchanger device or bank of heat exchanger device easily known to those skilled in the art, such as liquid to gas or gas to gas. Diverted thermal energy is channeled via conduit 26.

The exhaust gas then proceeds through conduit 28 to an exhaust gas accumulator and/or compressor unit 30. Accordingly, the pressurized exhaust gas can be dispensed to strategic locations of the greenhouse via an appropriate network of tubing and release valves 32.

In the greenhouse, a controller 34 connected to $CO_2$ gas monitor 38 will receive measurements on $CO_2$ gas levels. In accordance with a prespecified target concentration of $CO_2$ gas, normally around 1100 ppm for most plant species but possibly ranging from 500 to 2000 ppm, controller 34, will monitor the concentration of $CO_2$ gas. Controller 34, also connected to the release valves 32, will open or close valves 32 as required. Controller 34 is also advantageously connected to solid organic preparator unit 14, air source 12, combustion chamber 20 and heat exchanger unit 24 so as to automate the various phases of the $CO_2$ gas generation process in accordance with the need for $CO_2$ gas inside the greenhouse and in accordance with a prespecified computer subroutine controlling the logic processing of the apparatus.

Apparatus 10 may also comprise an ash removal device 36 to periodically purge the combustion chamber 20 of accumulated ashes so as to maintain a well-ventilated combustion area.

It has also been observed that the combustion of solid organic fuels generates trace amounts of fungicidal compounds including fungicidal compounds which will be dispensed in the greenhouse, thereby protecting plants against fungal attacks and promoting their unhampered growth.

In uses other than greenhouse $CO_2$ and fungicidal compound concentrations enhancers, the exhaust gases produced in accordance with the method and/or apparatus of the present invention may be separated and further purified by way of conventional methods.

EXAMPLES

The following example is provided for illustrative purposes only.

Example 1

The example provides measurement data on the concentration of various gases present in the ash box and the exhaust gas produced by the apparatus of the present invention and in accordance with the method of the present invention.

The concentration of gases produced from the combustion of solid organic matter according to the present invention was measured using a Hewlett Packard 5890 Series II Gas Layer Chromatograph modified by Wasson-ECE. The system comprises 3 Thermal Conductivity Detectors (TCD) and 1 Flame Ionizing Detector (FID). The Electrochemical Analyzer was a model 3500 LAND COM. All the instruments used were previously checked and calibrated against certified gas mixtures. Samples of the fumes originating from the stack of a corn furnace and in the ash box unit were collected in 6L stainless steel cylinders initially under vacuum. 20 minutes periods were used to collect each samples. Sample No. 1 was collected in the stack of a corn furnace according to the present invention while sample No. 2 was collected in its ash box. A $C_2H_4$ (ethylene) detection limit of 0.089 ppm and an uncertainty value of ±4% are applicable. Results are listed in Table 1 and Table 2.

TABLE 1

| Gas Layer Chromatographic Analysis | | | | |
| --- | --- | --- | --- | --- |
| Sample No. | $C_2H_4$ (ppm) | $CH_4$ (ppm) | $CO_2$ (%) | $O_2$ (%) |
| 1 | 0 | <200 | 8.0 ± 1.0 | 4.4 ± 0.5 |
| 2 | 0 | <200 | 7.1 ± 0.9 | 4.0 ± 1.0 |

TABLE 2

| Electrochemical Analysis | | | |
| --- | --- | --- | --- |
| Sample No. | CO (ppm) | NO (ppm) | $NO_2$ (ppm) |
| 1 | 38 | 0 | 80 |
| 2 | 116 | 61 | 100 |

Thus it is apparent from the above results that the exhaust gases and combustion ash contain essentially no ethylene and maintain high concentrations of $CO_2$. This supports the surprising discovery that solid organic fuel may be used to directly generate combustion gases suitable for use as sources of $CO_2$ gas and when used in a greenhouse environment, without deleterious effects to plant species.

Example 2

Observations were made of growth arrest of powdery mildew-causing fungi on tomato and cucumber plants grown in a greenhouse within which exhaust gas produced by the apparatus of the present invention was released following combustion of solid organic fuels. Powdery mildew, also called odium disease, is a common disease of many plants caused by fungi growing on the surface of the plants and conventionally controlled by use of fungicides such as sulfur sprays. Trace amounts of fungicidal compounds were detected in the stack gas dispensed in the greenhouse. Said compounds are known to protect plants from fungal attacks.

As many variations will become apparent to those skilled in the art from a reading of the foregoing disclosure, such variations are embodied within the spirit and scope of this invention as defined by the following appended claims.

What is claimed:

1. An improved method for producing carbon dioxide and fungicidal compounds which comprises in the steps of:
   (a) introducing into a forced air combustion chamber a first stream of air and a second stream consisting of a solid organic source selected from the solid organic fuels consisting of agricultural products including corn, shelled corn, crushed corn peat, corn kernels, ears of corns, corn cobs, straw, bagasse, wheat, beet, rye, barley, beans, potatoes, compressed organic material as a by-product of organic transformation industries and of wood transformation industries and mixtures thereof;
   (b) causing the combustion of said solid organic source resulting in the production of thermal energy, flue gas and waste ashes, said flue gas transporting said thermal energy and having a content indicative of a carbon dioxide production rate near a stoichiometric combustion equation and containing fungicidal compounds;
   (c) maintaining said first stream at a pressure greater than standard atmospheric pressure;
   (d) periodically purging said waste ashes from said combustion chamber so as to favor the maintenance of a well-aerated forced air fire;

(e) transporting said flue gas by passage through a conduit at a positive pressure, thereby creating a pressurized stream of exhaust gas rich in carbon dioxide and containing fungicidal compounds;

(f) accumulating said pressurized flue gas.

2. The method of claim 1 additionally comprising the step of producing thermal energy by cooling said flue gas of step (e) by passage through a heat exchanging element at a positive pressure and recovering said thermal energy from said heat exchanging element.

3. The method of claim 1 or 2 additionally comprising the step of causing a controlled release of said pressurized exhaust gas into a plant growing enclosure in need of a rise in its concentration of carbon dioxide content.

4. The method of claim 3 additionally comprising the step of measuring the concentration of carbon dioxide in said plant growing enclosure and modulating the controlled release of said pressurized exhaust gas in response to the measured concentration of carbon dioxide and in accordance with a preset standard for concentration of carbon dioxide.

5. The method of claim 4 wherein the preset standard for concentration of carbon dioxide is between 500 and 2000 ppm.

6. The method of claim 5 wherein the preset standard for concentration of carbon dioxide is between 1000 and 1200 ppm.

7. The method of claim 6 wherein said preset standard for concentration of carbon dioxide is approximately 1100 ppm.

8. The method of claim 4 wherein said exhaust gas contains less than 10 percent per volume of oxygen, is substantially free of ethylene.

9. The method of claim 8 wherein said exhaust gas contains less than 5 ppm of $C_2H_4$.

10. The method of claim 4 wherein said exhaust gas contains a substantial amount of excess air so as to limit exhaust gas temperature.

* * * * *